US011079357B2

(12) United States Patent
Ihn et al.

(10) Patent No.: US 11,079,357 B2
(45) Date of Patent: Aug. 3, 2021

(54) METHOD AND APPARATUS FOR ENHANCED VISUALIZATION OF ANOMALIES IN A STRUCTURE

(71) Applicant: The Boeing Company, Chicago, IL (US)

(72) Inventors: Jeong-Beom Ihn, Bellevue, WA (US); Jung-Ryul Lee, Daejeon (KR)

(73) Assignee: The Boeing Company, Chicago, IL (US)

(*) Notice: Subject to any disclaimer, the term of this patent is extended or adjusted under 35 U.S.C. 154(b) by 657 days.

(21) Appl. No.: 15/935,349

(22) Filed: Mar. 26, 2018

(65) Prior Publication Data
US 2019/0293608 A1    Sep. 26, 2019

(51) Int. Cl.
*G01N 29/06* (2006.01)
*G01N 29/24* (2006.01)
(Continued)

(52) U.S. Cl.
CPC ........ *G01N 29/069* (2013.01); *G01M 5/0033* (2013.01); *G01N 19/08* (2013.01); *G01N 21/1702* (2013.01); *G01N 29/043* (2013.01); *G01N 29/0672* (2013.01); *G01N 29/2418* (2013.01); *G01N 29/265* (2013.01); *G01N 2021/1706* (2013.01); *G01N 2291/017* (2013.01); *G01N 2291/0231* (2013.01); *G01N 2291/2632* (2013.01)

(58) Field of Classification Search
CPC .. G01N 29/069; G01N 29/2418; G01N 19/08; G01M 5/0033
See application file for complete search history.

(56) References Cited

U.S. PATENT DOCUMENTS

| 6,996,480 B2* | 2/2006 | Giurgiutiu | ........ G01M 5/0033 702/159 |
| 2003/0089171 A1* | 5/2003 | Kenefick | ................ G01N 19/08 73/597 |

(Continued)

FOREIGN PATENT DOCUMENTS

| JP | 2006-519369 A | * | 8/2006 | |
| JP | 5753346 B2 | * | 7/2015 | ........... A61B 8/5207 |

(Continued)

OTHER PUBLICATIONS

Extended European Search Report dated Jul. 17, 2019 in European Patent Application No. 191562693 (European counterpart to the instant U.S. patent application).

(Continued)

*Primary Examiner* — Ryan D Walsh
(74) *Attorney, Agent, or Firm* — Ostrager Chong Flaherty & Broitman P.C.

(57) ABSTRACT

Methods and apparatus for enhanced visualization of anomalies in a structure. The method comprises: acquiring pulse-echo laser ultrasonic wave propagation imaging video data at a multiplicity of points in a scan area on a surface of a structure; post-processing the pulse-echo laser ultrasonic wave propagation imaging video data using multiple-time window amplitude mapping to create a multiple-time window amplitude map; and displaying the multiple-time window amplitude map on a graphical user interface.

20 Claims, 12 Drawing Sheets

(51) Int. Cl.
*G01N 29/04* (2006.01)
*G01N 29/265* (2006.01)
*G01N 21/17* (2006.01)
*G01N 19/08* (2006.01)
*G01M 5/00* (2006.01)

(56) References Cited

U.S. PATENT DOCUMENTS

| | | | | |
|---|---|---|---|---|
| 2010/0042338 A1* | 2/2010 | Giurgiutiu | ......... | G01N 29/2475 702/39 |
| 2011/0087094 A1* | 4/2011 | Ohuchi | ............... | G01S 15/8993 600/437 |
| 2012/0327187 A1* | 12/2012 | Troy | ........................ | G01S 17/88 348/46 |
| 2013/0182008 A1* | 7/2013 | Zhou | ..................... | G06T 7/0014 345/629 |
| 2016/0217587 A1* | 7/2016 | Hay | .................... | G06F 16/7335 |
| 2016/0252616 A1* | 9/2016 | Wilby | ..................... | G01S 15/86 367/7 |
| 2016/0349217 A1* | 12/2016 | Lee | .................... | G01N 29/2418 |
| 2019/0025258 A1* | 1/2019 | Guibert | ................. | G06T 19/006 |

FOREIGN PATENT DOCUMENTS

| | | | | |
|---|---|---|---|---|
| WO | WO-2010048258 A1 * | 4/2010 | ............... | A61B 8/00 |
| WO | WO-2010077044 A2 * | 7/2010 | ......... | G01N 29/0654 |

OTHER PUBLICATIONS

Kumar et al., "Development and Applications of C-Scan Ultrasonic Facility," BARC Newsletter, No. 285, Oct. 1, 2007, pp. 49-57.
Endrerud et al., "DolphiCam User Manual," Jun. 27, 2013.
Teti et al., "Ultrasonic Identification and Measurement of Defects in Composite Material Laminates," CIRP Annals—Manufacturing Technology, vol. 39, No. 1, Jan. 1, 1990, pp. 527-530.
Sao et al., "Scanning acoustic microscopy as a tool for quantitative characterisation of damage in CFRPs," Composites Science and Technology, vol. 59, No. 3, Dec. 4, 2013, pp. 345-354.
Ehrhart et al., "Non-destructive evaluation (NDE) of aerospace composites: methods for testing adhesively bonded components," In: Non-Destructive Evaluation (NDE) of Polymer Matrix Composites, Jan. 1, 2013, pp. 220-237.
Lee, Chia, Park and Jeong, "Laser ultrasonic anomalous wave propagation imaging method with adjacent wave subtraction: Algorithm," Optics & Laser Technology, vol. 44 (2012), pp. 1507-1515.
Lee, Jang and Kong, "Fully Noncontact Wave Propagation Imaging in an Immersed Metallic Plate with a Crack," Shock and Vibration, vol. 2014, Article ID 895693, pp. 1-8 (http://dx.doi.org/10.1155/2014/895693).
European Examination Communication dated Mar. 5, 2021 in European Patent Application No. 19156269.3 (European counterpart to the instant U.S. patent application).
Mallet et al., "Structural health monitoring using scanning laser vibrometry: II. Lamb waves for damage detection," Smart Materials and Structures, vol. 13, No. 2, Apr. 2, 2004, pp. 261-269.

* cited by examiner

METHOD AND APPARATUS FOR ENHANCED VISUALIZATION OF ANOMALIES IN A STRUCTURE

BACKGROUND

This disclosure generally relates to apparatus and methods for processing images, and more particularly, to an apparatus and method for processing laser ultrasonic wave propagation images.

Pulse-echo laser ultrasonic wave propagation imaging (UWPI) is a noncontact sensing technique that enables three-dimensional (3-D) visualization of anomalies in structures (e.g., fiber-reinforced plastic material, hereinafter referred to as "composite material") for the purpose of non-destructive inspection. In some UWPI systems, a Q-switched continuous-wave laser is used to linearly scan an area on a structure, the laser pulses being directed normal to the surface (e.g., in the thickness direction). Then a laser Doppler vibrometer is used to detect laser-generated ultrasonic waves that propagate in the thickness direction at each fixed point. The scan data output by the laser Doppler vibrometer is then bandpass filtered to produce raw UWPI video data, which may be further post-processed to enhance the acquired images.

Previously, a single-time window amplitude mapping algorithm was employed to post-process a single image by using a single time window of ultrasonic wave propagation imaging data. However, this single-time window amplitude mapping algorithm forces users to choose an extended time window in order to represent every anomaly at different levels of thickness, which leads to inclusion of unnecessary frames and low quality of anomaly visualization. Furthermore, the calculation of the area of the anomaly using pulse-echo laser UMPI video data was only possible for simple shapes such as rectangles and circles and precisely locating the anomaly in the structure by observing only the scan result could be challenging.

SUMMARY

The subject matter disclosed in some detail below is directed to methods and apparatus for post-processing pulse-echo laser UMPI video data to enhance the visualization of anomalies in a structure. The post-processing enhancements proposed herein are of three types. First, a multiple-time window amplitude mapping algorithm is proposed herein that allows users to choose multiple time windows to visualize anomalies at different depths in a single image. Second, a polygonal anomaly area calculation enables automatic calculation of the area of a designated anomaly within the interface of the pulse-echo laser UWPI system. Third, an anomaly pointing function helps users to precisely locate the anomaly on the structure by interacting with a graphical user interface on which a UWPI video image is being displayed. These features enable enhanced visualization quality and precise calculation of the area and location of the anomaly.

Although various embodiments of methods and apparatus for post-processing pulse-echo laser UMPI video data to enhance visualization of anomalies in a structure will be described in some detail below, one or more of those embodiments may be characterized by one or more of the following aspects.

One aspect of the subject matter disclosed in detail below is a method for enhanced visualization of anomalies in a structure, comprising: (a) acquiring pulse-echo laser ultrasonic wave propagation imaging video data at a multiplicity of points in a scan area on a surface of a structure; (b) post-processing the pulse-echo laser ultrasonic wave propagation imaging video data using multiple-time window amplitude mapping to create a multiple-time window amplitude map; and (c) displaying the multiple-time window amplitude map on a graphical user interface. In accordance with one embodiment, step (b) comprises: designating pulse-echo laser ultrasonic wave propagation imaging video data in selected time windows; summing amplitude data that is included in the designated pulse-echo laser ultrasonic wave propagation imaging video data; and mapping the summed amplitude data.

Another aspect of the subject matter disclosed in detail below is a method for enhanced visualization of anomalies in a structure, comprising: (a) acquiring pulse-echo laser ultrasonic wave propagation imaging video data at a multiplicity of points in a scan area on a surface of a structure; (b) post-processing the pulse-echo laser ultrasonic wave propagation imaging video data to create a video freeze-frame; (c) displaying the video freeze-frame on a graphical user interface; (d) selecting at least three points on the video freeze-frame by human interaction with the graphical user interface; (e) calculating an area of a polygon defined by the at least three points; and (f) displaying alphanumeric symbology representing the area calculated in step (e) on the graphical user interface. The at least three points are positioned on a boundary of an image of an anomaly displayed on the graphical user interface.

A further aspect of the subject matter disclosed in detail below is a method for enhanced visualization of anomalies in a structure, comprising: (a) acquiring pulse-echo laser ultrasonic wave propagation imaging video data at a multiplicity of points in a scan area on a surface of a structure; (b) post-processing the pulse-echo laser ultrasonic wave propagation imaging video data to create a video freeze-frame; (c) displaying the video freeze-frame on a graphical user interface; (d) selecting a point on the video freeze-frame by human interaction with the graphical user interface; (e) converting pixel coordinates of the point selected in step (d) to spatial coordinates in a frame of reference of a positioner that supports a laser scanning head; (f) controlling the positioner to move the laser scanning head to a pointing position having the spatial coordinates resulting from step (e); and (g) activating the laser scanning head to emit a laser beam while the laser scanning head is in the pointing position. In accordance with one embodiment, steps (e) through (g) are performed automatically in response to step (d).

Yet another aspect of the subject matter disclosed in detail below is an apparatus for enhanced visualization of anomalies in a structure, comprising: a pulse-echo laser ultrasonic wave propagation imaging system comprising a laser scanning head; a graphical user interface; and a computer system configured to perform the following operations: (a) receiving pulse-echo laser ultrasonic wave propagation imaging video data from pulse-echo laser ultrasonic wave propagation imaging system; (b) post-processing the pulse-echo laser ultrasonic wave propagation imaging video data using multiple-time window amplitude mapping to create a multiple-time window amplitude map; and (c) controlling the graphical user interface to display the multiple-time window amplitude map.

Other aspects of methods and apparatus for post-processing pulse-echo laser UMPI video data to enhance visualization of anomalies in a structure are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

FIG. 7B is a diagram representing a window of a graphical user interface that is showing a video freeze-frame of the scan area depicted in FIG. 7A, which graphical user interface can be used to select vertices of a polygon that approximates the shape of an image of the anomaly depicted in

FIG. 7A.

Reference will hereinafter be made to the drawings in which similar elements in different drawings bear the same reference numerals.

DETAILED DESCRIPTION

Illustrative embodiments of methods and apparatus for post-processing pulse-echo laser UMPI video data to enhance the visualization of anomalies in a structure are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
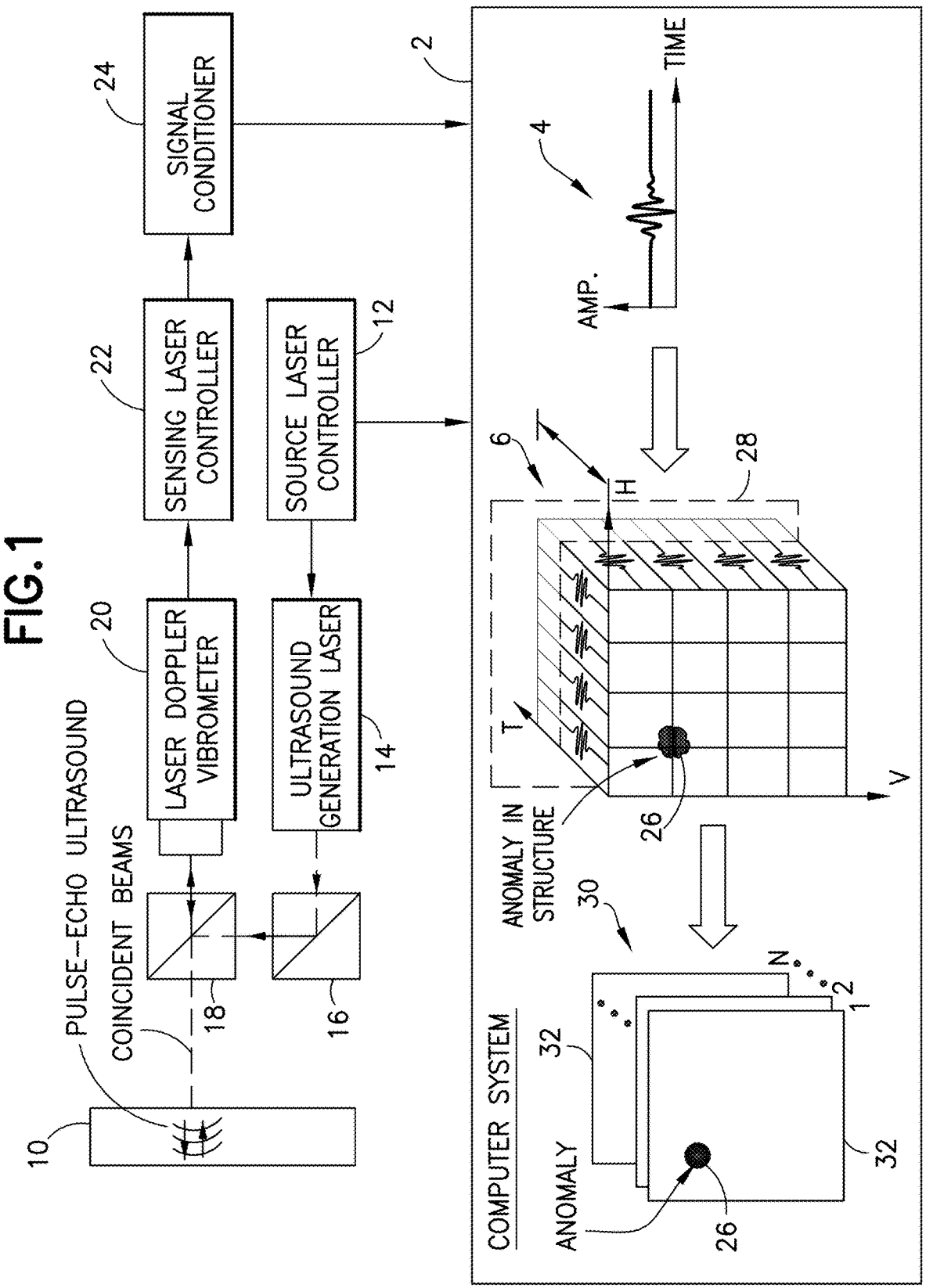
FIG. 1 is a block diagram identifying some components of a linear-scan pulse-echo laser UWPI system in accordance with one embodiment.

FIG. 1 is a diagram identifying some components of a linear-scan pulse-echo laser UWPI system in accordance with one embodiment. This system comprises at least the following components: a source laser controller 12, an ultrasound generation laser 14 (e.g., a Q-switched solid-state diode pumped laser), a first optical mirror 16, a second optical mirror 18, a laser Doppler vibrometer 20 (incorporating a sensing laser, a photodetector and other well-known optical components), a sensing laser controller 22, an in-line signal conditioner 24 (incorporating bandpass filters and amplifiers), and a computer system 2 that is configured with programming that facilitates acquisition and post-processing of the video data acquired by the system. Although not shown in FIG. 1, the ultrasound generation laser 14, first and second optical mirrors 16 and 18, and laser Doppler vibrometer 20 are fixedly incorporated in a laser scanning head (see scanning laser head 66 in FIG. 11) that is in turn mounted to a two-axis linear positioner capable of translating the laser scanning head in X and Y directions. The computer system 2 is configured to control the two-axis linear positioner to move the ultrasound generation laser 14 and laser Doppler vibrometer 20 spatially in relation to a stationary test specimen, thereby enabling an area on a surface of the test specimen to be scanned simultaneously by respective laser beams emitted by the ultrasound generation laser 14 and laser Doppler vibrometer 20.

In FIG. 1, the linear-scan pulse-echo laser UWPI system is depicted in relation to a test specimen 10 which has been placed in the path of the laser pulses produced by the ultrasound generation laser 14 under the control of the source laser controller 12. The laser pulses are generated by a Q-switching technique at a pulse repetition rate. The laser pulses emitted by the ultrasound generation laser 14 are reflected by the first optical mirror 16 toward the second optical mirror 18. That second optical mirror 18 in turn reflects the laser pulses toward the test specimen 10, preferably at an angle normal to the surface of the test specimen 10. In the case where the test specimen is a composite laminate comprising a stack of plies having a thickness, the laser pulses are propagating in the thickness direction. The pulses of laser light emitted by the ultrasound generation laser 14 impinge on the surface of the test specimen, generating a thermoelastic wave with abrupt thermal expansion. That pulsating thermal expansion of the material of the test specimen 10 in turn induces ultrasonic waves that propagate in the thickness direction in various modes. Those ultrasonic waves in turn cause the surface of the test specimen to move, which movement are detected by the laser Doppler vibrometer 20.

More specifically, when a laser pulse from ultrasound generation laser 14 impinges on the surface of the test specimen, an ultrasonic wave is created at the affected point (e.g., where the laser spot is located), causing the area surrounding the affected point to vibrate. At the same time that the ultrasound generation laser 14 is producing laser pulses of a first wavelength, the sensing laser inside the laser Doppler vibrometer 20 emits a sensing laser beam having a second wavelength different than the first wavelength of the pulsed laser beam. (In the alternative, the sensing laser may be implemented using a continuous-wave laser interferometer.) The laser Doppler vibrometer 20 is located so that the emitted sensing laser beam propagates through the second optical mirror 18 and is coincident with the pulsed laser beam from the ultrasound generation laser 14. The coincident beams impinge on the surface of the test specimen at the same point. Light scatters from the target in all directions, but some portion of the light is captured by the laser Doppler vibrometer 20. More specifically, after each laser pulse of first wavelength impinges on the test specimen 10, some of the impinging coincident laser light of first and second wavelengths is scattered back toward the second optical mirror 18 and transmitted by the second optical mirror 18 onto the photodetector of the laser Doppler vibrometer 20.

Ultrasonic sensing using the laser Doppler vibrometer 20 is based on the detection of the frequency shift of the returned laser light of the second wavelength (e.g., the frequency shift of the returned laser light of the first wavelength is filtered out). In particular, the amplitude and frequency of the ultrasonic waves are extracted from the Doppler shift in the frequency of the reflected laser beam, which shift is due to the motion of the surface of the test specimen.

In accordance with one embodiment, the laser Doppler vibrometer 20 is a two-beam laser interferometer that measures the frequency (or phase) difference between an internal reference beam and the sensing laser beam. The laser sensing beam is interfered with the reference beam on a photodetector, typically a photodiode. Most commercial vibrometers work in a heterodyne regime by adding a known frequency shift (typically 30-40 MHz) to one of the beams. This frequency shift is usually generated by a Bragg cell or acousto-optic modulator. The output of the photodetector is a standard frequency modulated signal, with the Bragg cell frequency as the carrier frequency and the Doppler shift as the modulation frequency. This signal can be demodulated to derive the velocity of the vibrating surface of the test specimen during a time interval or window.

The output of the laser Doppler vibrometer 20 is a continuous analog voltage that is directly proportional to the target velocity component along the direction of the laser beam. The electrical signals produced by the photodetector of the laser Doppler vibrometer 20 are amplified and band-pass filtered by the signal conditioner 24 to extract the measured time domain ultrasonic wave and then the signal-conditioned electrical signals (representing video data) are stored in a non-transitory tangible computer-readable storage medium either incorporated in the computer system 2 or accessible by the computer system 2.

During post-processing, the computer system 2 executes signal processing algorithms and then controls a display screen to visualize the wave propagation using a UWPI algorithm. The UWPI algorithm is configured to produce a visualization (e.g., a video freeze-frame 32 extracted from the UWPI video 30) of propagation for through-the-thickness ultrasonic waves, in the time or frequency domain, based on 3-D data processing. Some of the post-processing steps (which are performed by a post-processor incorporated in the computer system 2) are illustrated in FIG. 1.

The ultrasonic wave propagation image generated by the computer system 2 is an image which shows ultrasonic waves that have propagated through at least a portion of the thickness of a structure and then returned to the surface over time. The ultrasonic propagation image corresponds to a moving or still image in which the results of the sensing acquired through scanning are time-synchronized and arrayed. For example, an ultrasonic wave generated at the surface of the test specimen 10 by the laser pulses may propagate in the thickness direction toward the rear wall of the test specimen, but may be reflected at an interface where an anomaly is located. The through-the-thickness location of the anomaly may be calculated based on a propagating time and a propagation speed. In addition, the computer system 2 further processes the signals resulting from the sensing in a frequency, wave number, or wavelength domain, and presents the result of the sensing as a moving or still image.

FIG. 1 illustrates at a high level some aspects of the post-processing operations which the computer system 2 is configured to perform. First, the computer system 2 detects the amplitude of the incoming electrical signals from the signal conditioner 24 as a function of time. Optionally, the system operator may input a command instructing the computer system 2 to cause an amplitude-versus-time graph 4 to be displayed on an associated display screen. This display process may involve an image processor sending data and commands to a separate display processor that controls the display screen, both the image processor and the display processor being incorporated in the computer system 2. The resulting waveform represents the time-varying amplitude of the pulse-echo ultrasound signal.

Second, the image processor is also configured to perform a through-the-thickness ultrasound-based pulse-echo ultrasonic propagation imaging technique. As shown in FIG. 1, an anomaly in the test specimen 10 is visualized (as represented by an image 26 of an anomaly) by using the pulse-echo ultrasonic propagation imaging technique based on the through-the-thickness ultrasonic waves acquired from the test specimen 10 as a result of scanning the surface of the test specimen 10. One-dimensional electrical signals collected by scanning an array of points in an area on the surface of the test specimen are rearranged to form a three-dimensional video data array 6 (hereinafter "3-D data array 6"). Each time sequence in the 3-D data array 6 is a respective data subset representing a respective pulse-echo ultrasound signal at a respective point where a pulsed laser beam impinged during the scanning process. In the example depicted in FIG. 1, the number of data elements in a vertical dimension of the 3-D data array 6 (corresponding to the height of the scanned area on the surface of the test specimen 10) is V and the number of data elements in a horizontal dimension of the 3-D data array 6 (corresponding to the width of the scanned area on the surface of the test specimen 10) is H. The arrow T in FIG. 1 represents the time axis. For the purpose of illustration, the exemplary 3-D data array 6 presented in FIG. 1 shows a black area representing an image 26 of an anomaly.

The dashed rectilinear lines in the 3-D data array 6 represent a slicing plane 28, which can be used to produce a time sequence of N video freeze-frames 32 of video data to form a UWPI video 30. Thus the total number of data elements in the 3-D data array 6 will be the product of H×V×N. The system operator may input a command instructing the computer system 2 to cause any one of the multiplicity of video freeze-frames 32 to be displayed on the associated display screen. All of the video freeze-frames 32 may be taken at the moments when the maximum ultrasonic amplitudes at the anomaly location appeared. Thus images can be generated along a time axis T to present a UWPI video 30 for viewing. When a moving image is made based on the signals, the system operator is able visualize how uniform ultrasound waves are propagated through the thickness of the test specimen 10 over the full scan field.

In summary, first the ultrasound generation laser 14 emits a laser beam pulse that generates ultrasonic waves of various modes. Among the ultrasonic waves of various modes, the laser Doppler vibrometer 20 acquires a pulse-echo ultrasound signal, which is one point in a video freeze-frame 32 of a UWPI video 30. Both the laser pulses and the sensing laser beam are emitted as coincident beams at each of a multiplicity of points that cover the scan area.

Figure 2:
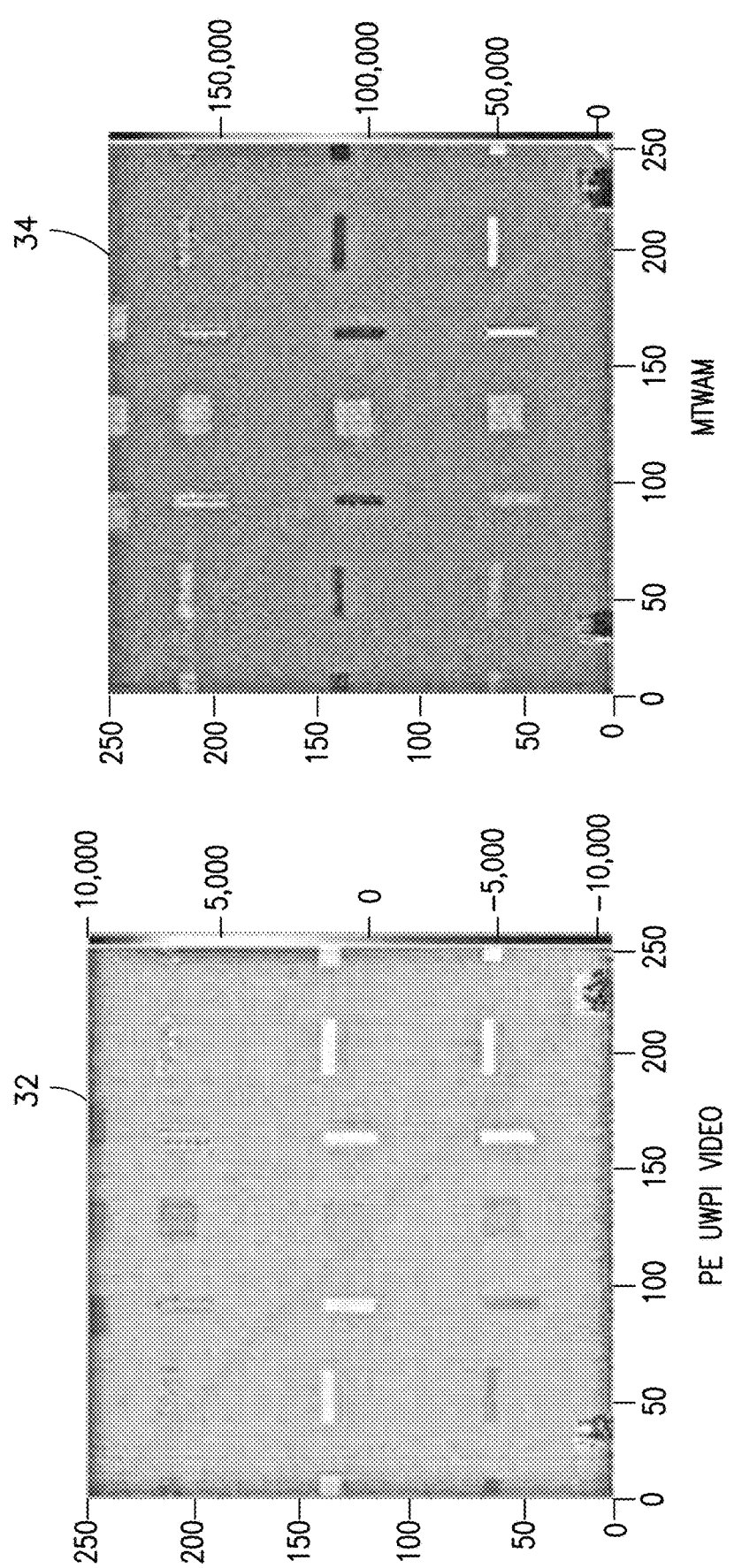
FIG. 2 is a diagram showing two windows which appear on a graphical user interface in accordance with one embodiment, the window on the left displaying a pulse-echo (PE) laser UWPI video and the window on the right displaying a multiple-time window amplitude map (MTWAM).

FIG. 2 is a diagram showing two windows which may be displayed on a graphical user interface in accordance with one embodiment of the post-processing methodology proposed herein. The window on the left displays a freeze frame 32 extracted from a UWPI video 30 that visualizes ultrasonic wave propagation in a test specimen 10 having a multiplicity of artificial (e.g., manufactured) inclusion anomalies distributed in a pattern. The test specimen 10 was made of composite material (e.g., made of carbon fiber/epoxy prepregs) having a thickness of 2.75 mm. The window on the right displays a multiple-time window amplitude map 34 (MTWAM) derived from the UWPI video 30 using the methodology proposed herein. The contrasting images show an improvement in the visualization of anomalies at all depths when multiple-time window amplitude mapping is used. The post-processor (e.g., computer system 2 configured with post-processing software) carries out multiple-time window amplitude mapping, polygonal defect area calculation, and defect pointing.

Figure 3:
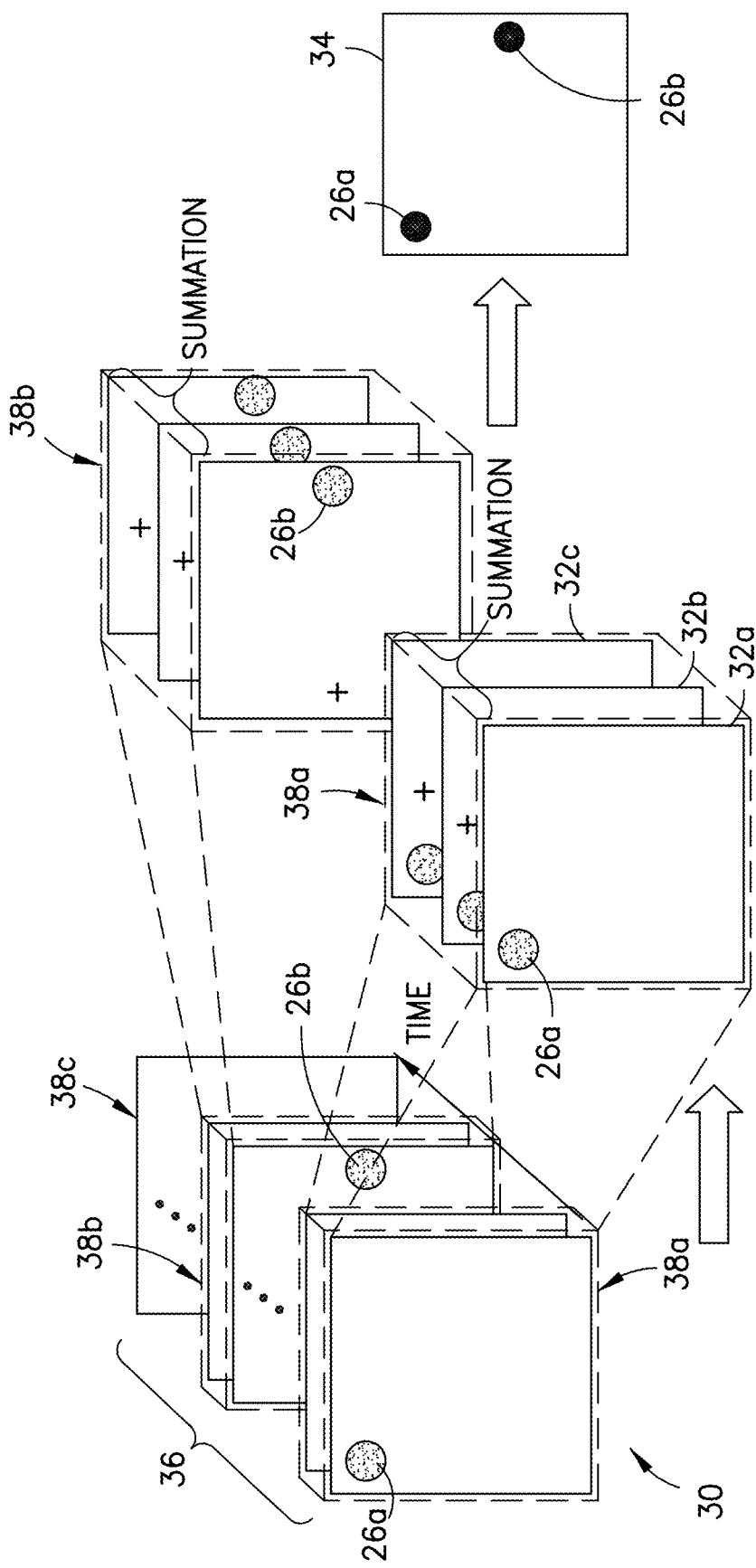
FIG. 3 is a diagram showing steps in a method for producing a multiple-time window amplitude map in accordance with one embodiment.

FIG. 3 is a diagram showing steps in a method for deriving a multiple-time window amplitude map 34 from a pulse-echo ultrasonic wavefield 36 of a UWPI video 30 in accordance with one embodiment. The full UWPI video 30 comprises a multiplicity of video freeze-frames 32 (32a, 32b, 32c) which can be correlated with respective depths in the test specimen 10 (see FIG. 1) based on the speed of wave propagation. In the example depicted in FIG. 3, an image 26a of a first anomaly (hereinafter "first anomaly image 26a") can be seen in video freeze-frames belonging to a first time window 38a; an image 26b of a second anomaly (hereinafter "second anomaly image 38b") can be seen in video freeze-frames belonging to a second time window 38b; and no image of an anomaly is seen in the first video freeze-frame of a third time window 38c. In the next step, the time windows containing amplitude information produced by anomalies (e.g., amplitudes having a maximum magnitude greater than a predetermined threshold) are selected for further processing. In the example depicted in FIG. 3, time window 38a and time window 38b were selected. In the final step, the amplitude magnitudes in the selected video freeze-frames of time windows 38a and 38b are summed to produce a multiple-time window amplitude map 34. The resulting image contains first and second anomaly images 26a and 26b which are readily discernible by an observer.

The above-described multiple-time window amplitude mapping technique enables multiple anomalies at different depths in a test specimen to be visualized in a single image and provides superior signal-to-noise ratio and visualization quality.

Figure 4:
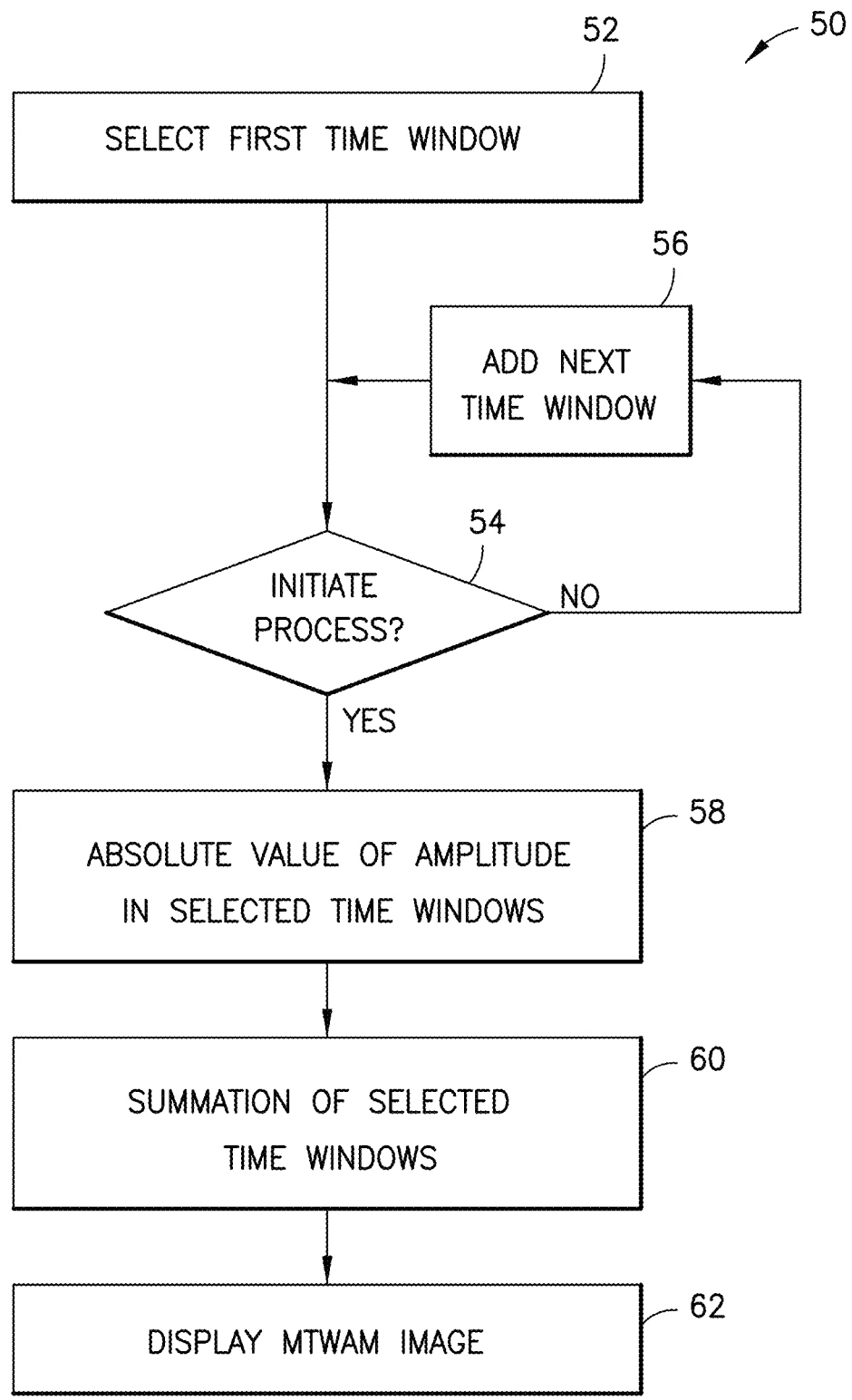
FIG. 4 is a flowchart identifying steps of a method for displaying a multiple-time window amplitude map in accordance with one embodiment.

FIG. 4 is a flowchart identifying steps of a method 50 for displaying multiple-time window amplitude map 34 in accordance with one embodiment. The first time window is selected in step 52. Then a determination is made whether the process for deriving multiple-time window amplitude map 34 should be initiated (step 54). If additional time windows contain amplitudes of interest, then the next time window is added (e.g. selected) in step 56. This iterative process continues until all time windows containing amplitudes of interest have been selected. When there are no more time windows of interest, the amplitude values of selected time windows are converted to absolute values in step 58, and then those absolute values of the selected time windows are summed in step 60. Finally, the results of this summation are then displayed in the form of a multiple-time window amplitude map (MTWAM) in step 62, as seen in FIG. 2.

Figure 5A:
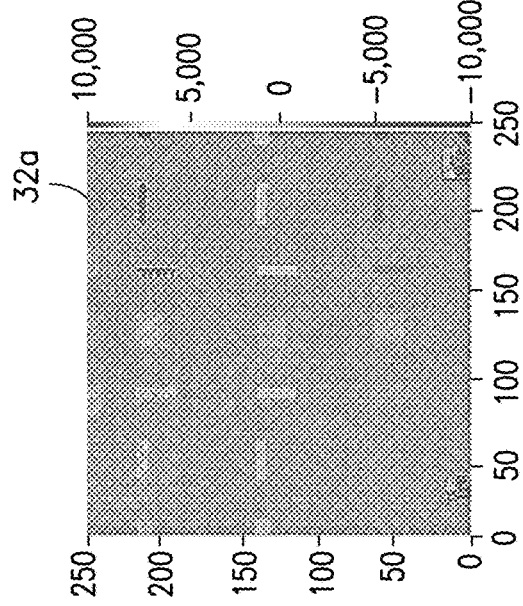
FIGS. 5A-5C show scan results for a 2.75-mm-thick composite test specimen having artificial inclusion anomalies distributed in a pattern.
Figure 5B:
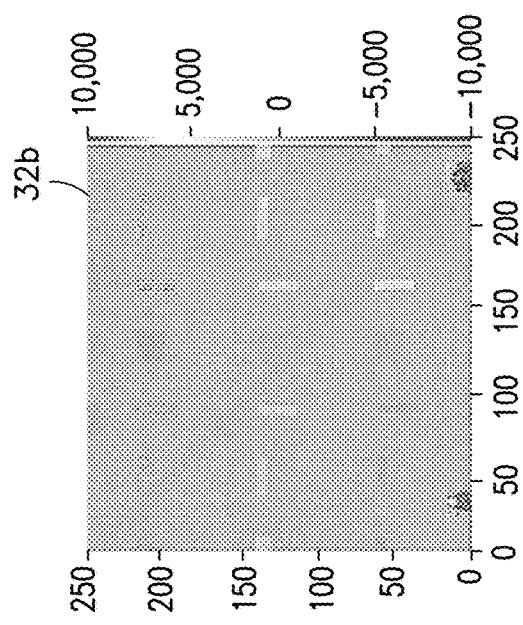
Figure 5C:
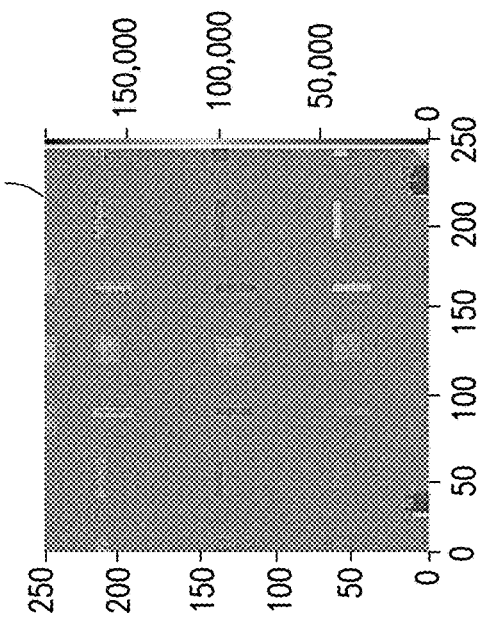

FIGS. 5A-5C show scan results for a 2.75-mm-thick composite test specimen having artificial inclusion anomalies distributed in a pattern. FIG. 5A shows a PE UWPI video freeze-frame at 2.933 µs. Some anomalies are not included because they were placed at different depths. However, FIG. 5B shows a PE UWPI video freeze-frame at 5.433 µs in which some of the anomalies not visible in FIG. 5A are now visible. By using 2.933-2.983 µs and 5.433-5.850 µs time windows for multiple-time window amplitude mapping, a multiple-time window amplitude map 34 was obtained as shown in FIG. 5C. Comparison of the images depicted in FIGS. 5A-5C revealed that the multiple-time window amplitude map 34 contained every anomaly and provided superior quality of visualization.

In accordance with a further aspect of the post-processing techniques proposed herein, the computer system 2 is configured to execute an algorithm by which the area of a polygon approximating the shape of anomaly in a test specimen can be calculated. To the extent that the shape of the anomaly is not precisely polygonal, the result of the calculation is an estimated area of the anomaly. This estimate may vary from the actual area of the physical anomaly to the extent that the shape of the anomaly deviates from a true polygon.

Figure 6:
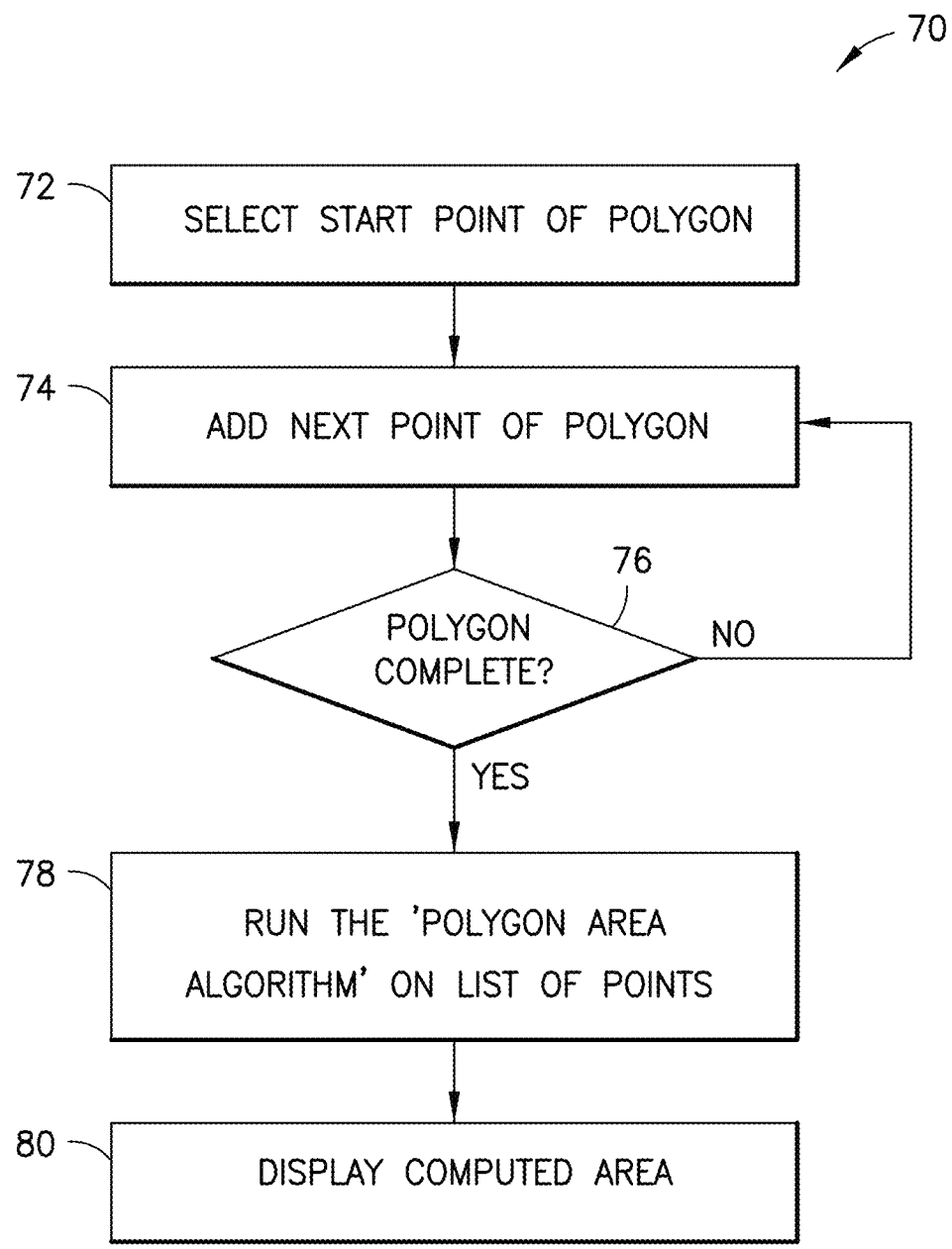
FIG. 6 is a flowchart identifying steps of a method for calculating the area of a polygon that approximates the shape of an anomaly in a test specimen in accordance with one embodiment.

FIG. 6 is a flowchart identifying steps of a method 70 for calculating the area of a polygon that approximates the shape of an anomaly in a test specimen in accordance with one embodiment. The user viewing the graphical user interface that displays an image of an anomaly first selects one vertex of a polygon as a starting point by clicking on one point on the graphical user interface using a cursor in step 72. As used herein, the term "polygon" means a polygon that is either convex or concave and not self-intersecting. It should be borne in mind at this juncture in the disclosure that the final polygon does not yet appear on the graphical user interface when the first vertex is selected, but rather will only fully appear when all vertices have been selected. In the next step 74, the next vertex (e.g. point) of the polygon is selected, again by clicking on another point on the graphical user interface using the cursor. The system then receives an input from a user about whether the polygon is complete or not, in step 76. If the user responds that the polygon is not complete, then the user repeats step 74, following which step 76 is repeated. In response to each selection of a vertex, the computer system 2 stores the (x, y) coordinates of the pixel on the display screen that was clicked on. Digital data representing a list of the pixel coordinates of the vertices selected by the user is stored in a non-transitory tangible computer-readable storage medium.

Steps 74 and 76 are reiterated until the user has indicated that the polygon is complete, meaning that the user has selected all vertices of the polygon. The user then interacts with the graphical user interface to instruct the computer system 2 to run a polygon area calculation algorithm on the list of points in step 78. In the course of executing this algorithm, the following operations are performed by the computer system: (1) the digital data representing the pixel coordinates of the vertices of the polygon are retrieved from the non-transitory tangible computer-readable storage medium; (2) the retrieved pixel coordinates are converted into spatial coordinates in the frame of reference of the test specimen based on a conversion rate determined during a calibration procedure carried out before the start of the imaging session; and (3) an estimate of the area of the polygon is calculated using the spatial coordinates. The computed area is then displayed on the graphical user interface in step 80.

Figure 7A:
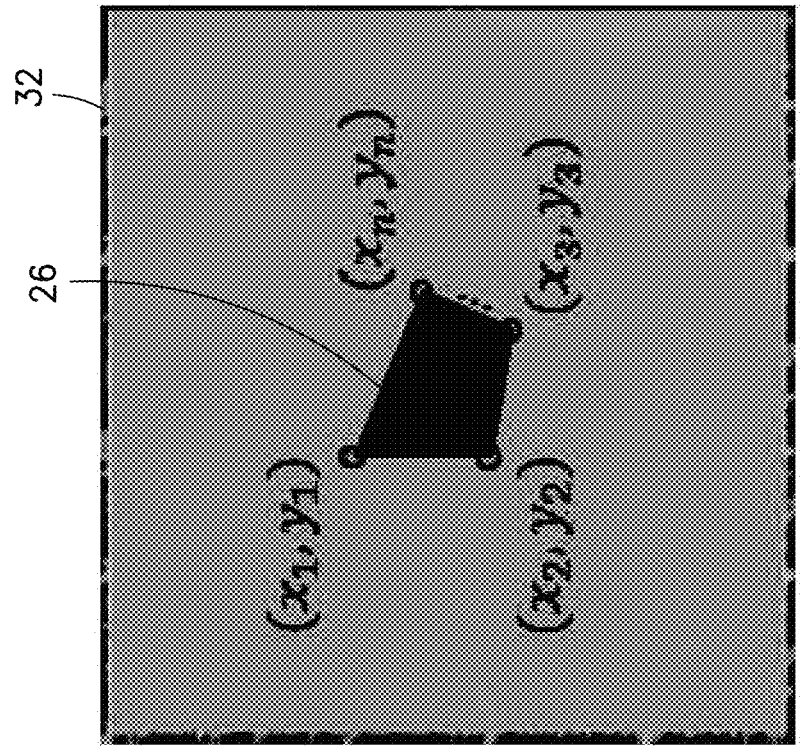
FIG. 7A is a diagram representing a scan area on a structure that includes a polygon-shaped anomaly.
Figure 7B:
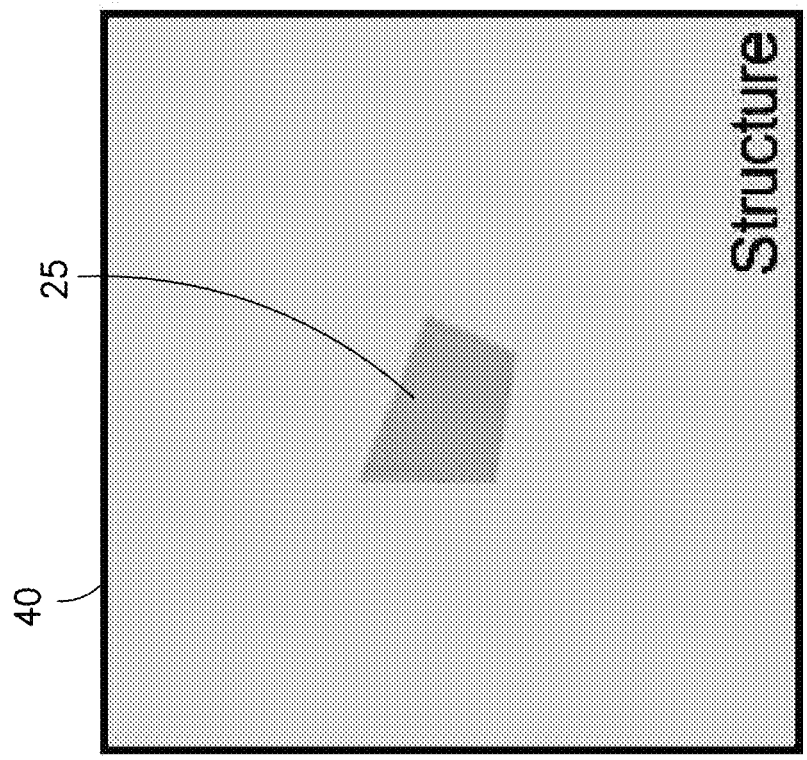

FIG. 7A is a diagram representing a scan area 40 on a structure that includes a polygon-shaped anomaly 25. FIG. 7B is a diagram representing a window of a graphical user interface that is showing a video freeze-frame 32 of the scan area 40 depicted in FIG. 7A, which graphical user interface can be used to select vertices of a polygon that approximates the shape of an image 26 of the anomaly 25 depicted in FIG. 7A. Once polygon representation is complete, the area of the polygon can be computed. In accordance with one proposed implementation, the polygon area equation disclosed in the CRC Standard Mathematical Tables (Beyer, W. H. (Ed.), 28th ed., Boca Raton, Fla., CRC Press (1987), pp. 123-124) can be used.

As seen in the example depicted in FIG. 7B, the user may select n vertices to form an n-sided polygon, where n is an integer greater than two. The coordinates (in the frame of reference of the test specimen, not the pixel coordinates) of the vertices of such an n-sided polygon are $(x_1, y_1)$, $(x_2, y_2)$, $(x_3, y_3)$, . . . , $(x_n, y_n)$. The area A of the polygon can then be computed using the equation:

$$A = \frac{1}{2}\left(\left|\begin{matrix} x_1 & x_2 \\ y_1 & y_2 \end{matrix}\right| + \left|\begin{matrix} x_2 & x_3 \\ y_2 & y_3 \end{matrix}\right| + \ldots + \left|\begin{matrix} x_n & x_1 \\ y_n & y_1 \end{matrix}\right|\right)$$

In cases where a composite part, such as a wing box of an aircraft, undergoes UWPI and an anomaly is revealed, the shape of that anomaly can be approximated by a polygon and then the area of that polygon can be computed in the coordinate system of the wing box to provide a measure of the size of the anomaly. More precisely, the polygon approximates the shape of the image of the anomaly that appears on the graphical user interface. The polygon is defined by the user selecting at least three points which are positioned on a boundary of the image of the anomaly.

Figure 8A:
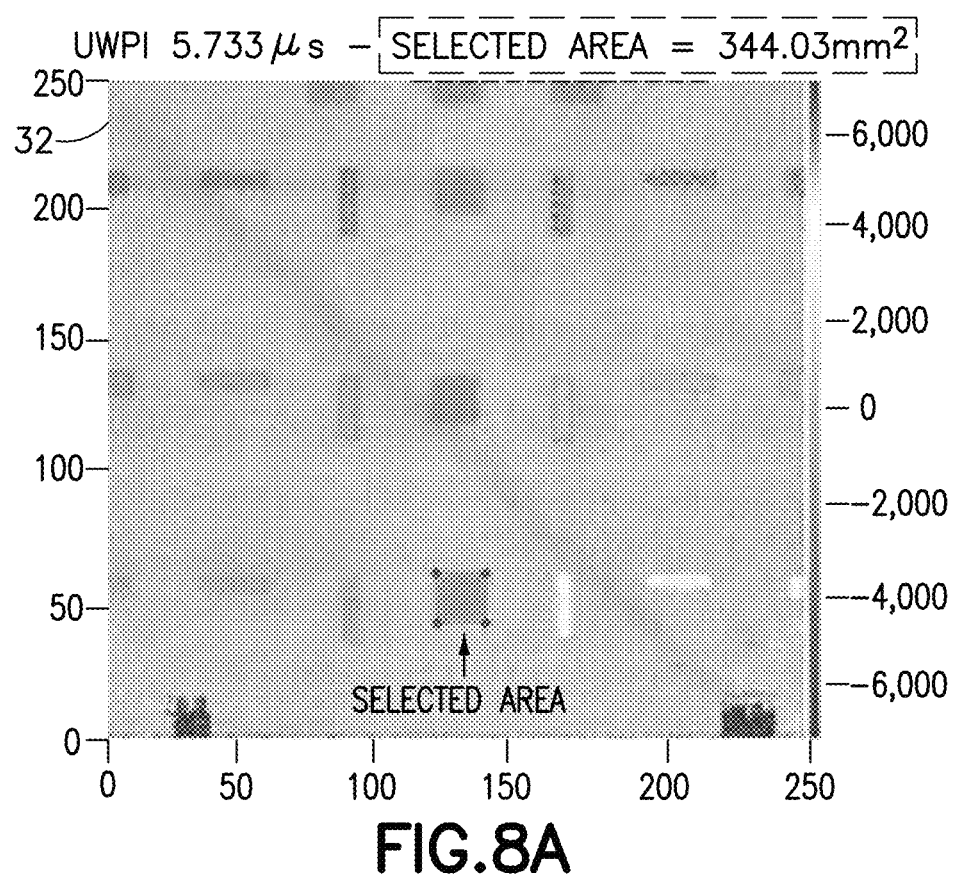
FIG. 8A is a diagram representing a window on a graphical user interface that shows the result of a calculation of the area of an image of one anomaly of a multiplicity of artificial anomalies included in a 2.75-mm-thick composite test specimen, which image appears in one video freeze-frame of the UWPI video.

FIG. 8A is a diagram representing a window on a graphical user interface that shows the result of a calculation of the area of the image of one anomaly of a multiplicity of artificial anomalies included in a 2.75-mm-thick composite test specimen, which image appears in one video freeze-frame 32 of the UWPI video taken at 5.733 μs (which is the same as in FIG. 5B). The result of the polygonal anomaly area calculation was 344.04 mm². As seen in FIG. 8A, the calculation result is displayed on top of the video freeze-frame 32.

Figure 8B:
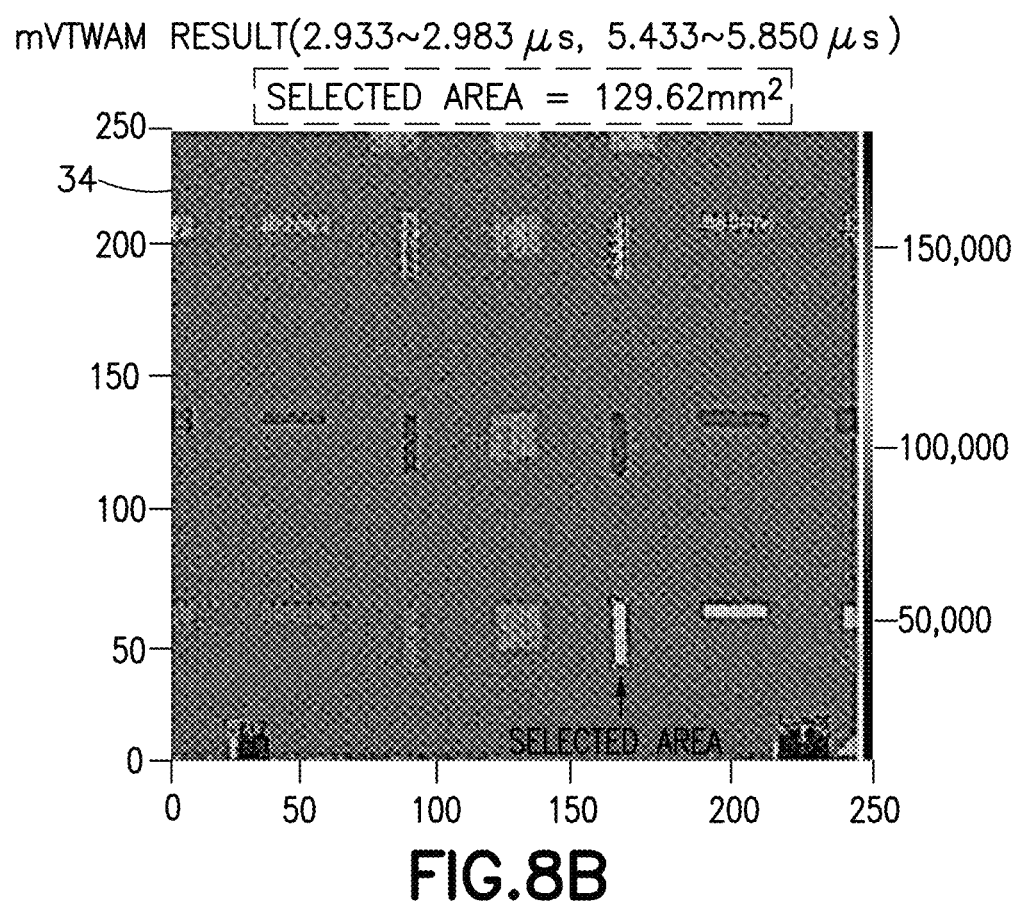
FIG. 8B is a diagram representing a window on a graphical user interface that shows the result of a calculation of the area of an image of one anomaly from the same multiplicity of artificial anomalies that appear in FIG. 8A, which image appears in a multiple-time window amplitude map derived from the same UWPI from which the video freeze-frame depicted in FIG. 8A was extracted.

FIG. 8B is a diagram representing a window on the same graphical user interface that shows the result of a calculation of the area of the image of one of a multiplicity of artificial anomalies included in the same 2.75-mm-thick composite test specimen. This image appears in a multiple-time window amplitude map 34 derived from the same UWPI that produced the video freeze-frame 32 depicted in FIG. 8A, but using 2.933-2.983 μs and 5.433-5.850 μs time windows for the multiple-time window amplitude mapping (which is the same as in FIG. 5C). The result of the polygonal anomaly area calculation was 129.62 mm². As seen in FIG. 8B, the calculation result is displayed on top of the multiple-time window amplitude map 34.

Figure 9:
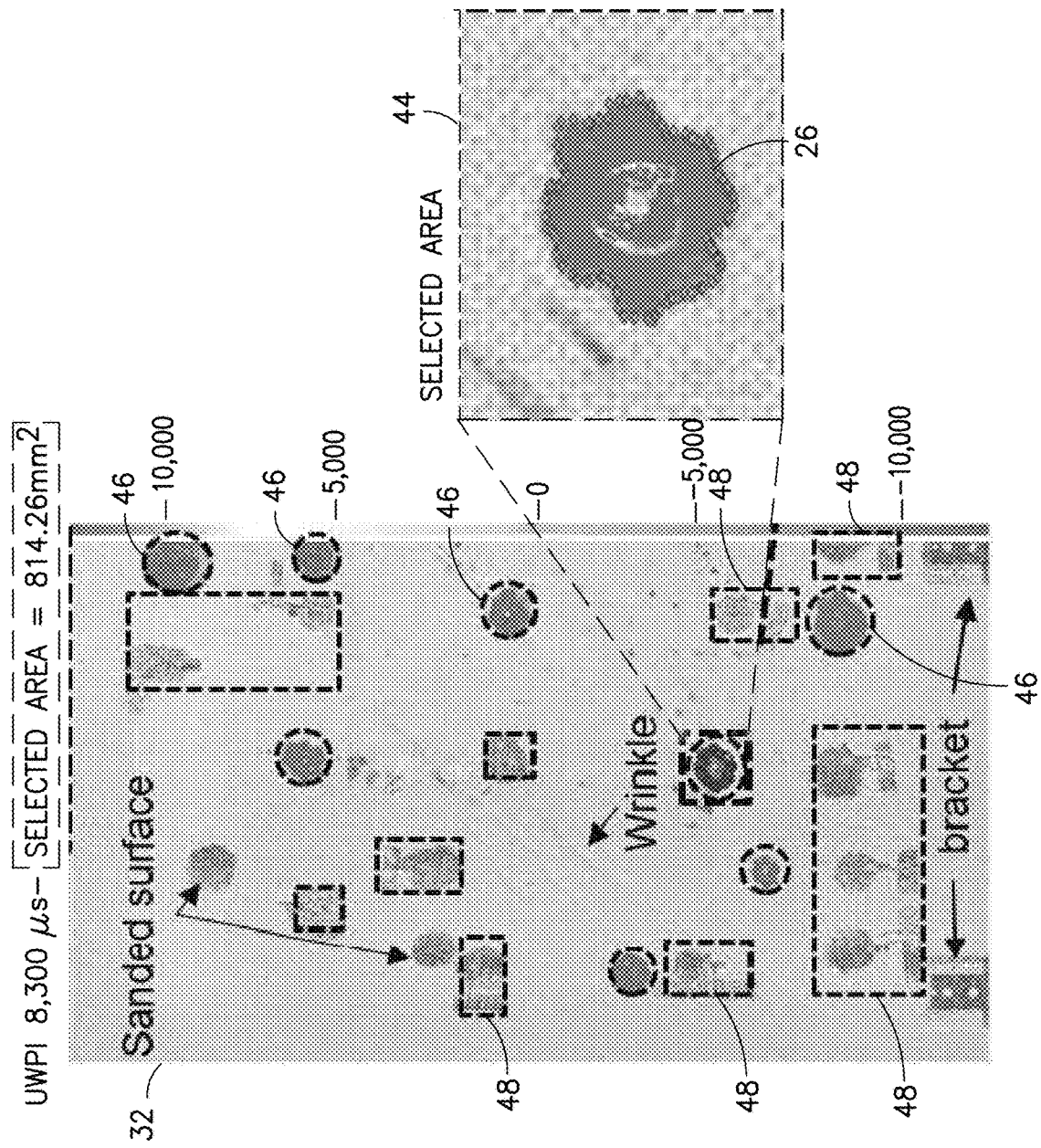
FIG. 9 is a diagram representing a window on a graphical user interface that shows the result of a calculation of the area of one anomaly of a multiplicity of anomalies included in a 7-mm-thick composite test panel with impact damage that appear in one video freeze-frame of a UWPI video.

To facilitate another experiment, a 7-mm-thick composite test panel was constructed with different types of anomalies, including delamination due to impact, sanded surfaces, wrinkles and patched piezoelectric transducers. That test panel was then subjected to UWPI. A video freeze-frame acquired at 8.3 μs is depicted in FIG. 9, which represents a window on a graphical user interface and further shows the result of a calculation of the area of an image 26 of the anomaly in a selected area 44 of the video freeze-frame 32. In this example, the anomaly is a delamination due to impact. Other anomalies included other delaminations in delamination areas 46 (indicated by dashed circles in FIG. 9) and patched piezoelectric transducer areas 48 (indicated by dashed rectangles in FIG. 9). FIG. 9 shows that the area of the image 26 of the anomaly in the selected area 44 was 814.06 mm² and clearly reveals that precise area calculation is also possible for a delamination due to impact having a very complex shape using the polygonal anomaly area calculation function.

Figure 10:
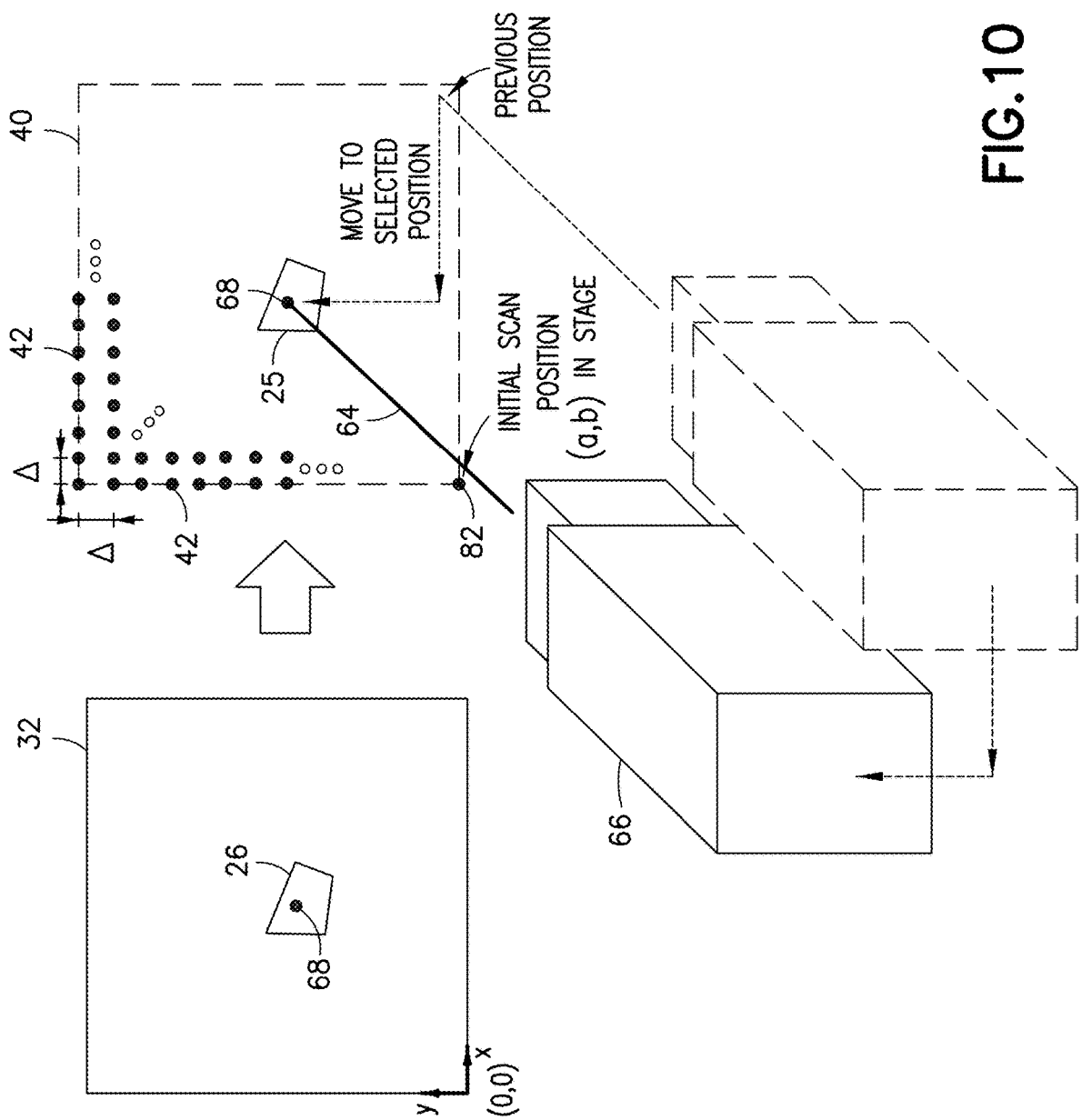
FIG. 10 is a diagram showing the use of an anomaly pointing function to move a laser scanning head to a position whereat an emitted laser beam impinges on an anomaly in a test specimen.

FIG. 10 is a diagram showing the use of an anomaly pointing function to move a laser scanning head 66 to a position whereat the emitted laser beam impinges on an anomaly in a scan area 40 on the surface of the test specimen 10. The laser scanning head 66 houses the ultrasound generation laser 14, first and second optical mirrors 16 and 18, and laser Doppler vibrometer 20. As previously mentioned, the scanning laser head 66 is mounted to a two-axis linear positioner 90 (see FIG. 11) capable of translating the laser scanning head 66 in X and Y directions.

The rectangle in the upper left-hand corner of FIG. 10 represents a PE UWPI video freeze-frame 32 produced by scanning a scan area 40 (shown in the upper right-hand corner of FIG. 10). The black dots spaced at a regular scan interval Δ on scan area 40 represent respective laser spots 42 produced during scanning of the surface. Only some of the laser spots 42 are shown for the purpose of illustration, with the understanding that the entire scan area 40 is scanned by activating the laser beam 64 intermittently after each incremental movement by a distance equal to the scan interval Δ.

In addition, while the video freeze-frame 32 includes an image 26 of an anomaly which appears to have a quadrilateral shape (e.g., a polygon with four sides), the scan area 40 includes the physical anomaly 25 that produced the image 26 seen in freeze frame 32.

To further clarify FIG. 10, each pixel of the video freeze-frame 32 has pixel coordinates which are correlated to an (x, y) coordinate system of the test specimen with an origin (0, 0) at the lower left-hand corner of the freeze frame 32. However, when the scanning laser head 66 is at an initial scan position 82, the laser beam 64 has coordinates (a, b) in the coordinate system of the two-axis linear positioner 90. Thus, commands to move the linear scanning head 66 to another position are given in the form of coordinates in the frame of reference of the two-axis linear positioner 90. For example, as depicted in FIG. 10, if the user selects a point 68 in video freeze-frame 32 having coordinates (x, y) in the frame of reference of the test specimen, then the two-axis linear positioner 90 is instructed by the computer system 2 (see FIG. 1) to move the laser scanning head 66 such that the laser beam 64 impinges on a point having coordinates (x+a, y+b) in the frame of reference of the two-axis linear positioner 90.

The process for enabling a user to activate an automated anomaly pointing function will now be described. First, the user selects a point 68 on the image 26 of an anomaly visible in the video freeze-frame 32. The selected point has a position (x, y) in the coordinate system of the test specimen 10. This position is then converted to a corresponding position (x+a, y+b) in the coordinate system of the two-axis linear positioner 90. Finally, the scanning laser head 66 is moved from the position indicated by dashed lines in FIG. 10 to the selected position (x+a, y+b) (indicated by solid lines in FIG. 1) in order for the laser beam 64 to be pointed at the anomaly 25. Thus the laser beam 64 can be moved so that it points at whichever position within the scan area 40 has been selected by the user. During non-destructive inspection of a composite part, the ability to point a laser beam 64 at a point on the composite part by clicking on a corresponding point on a video freeze-frame 32 allows an inspector to then perform additional inspection of the anomaly, including addition UWPI. In the alternative, the inspector may mark the position being pointed at on the composite part, thereby designating the area for testing or repair at a later time.

While the above-disclosed method of employing the anomaly pointing function involved the user selecting a point 68 in a video freeze-frame 32, in the alternative the user could achieve the same automated pointing by selecting a corresponding point on a multiple-time window amplitude map 34.

Figure 11:
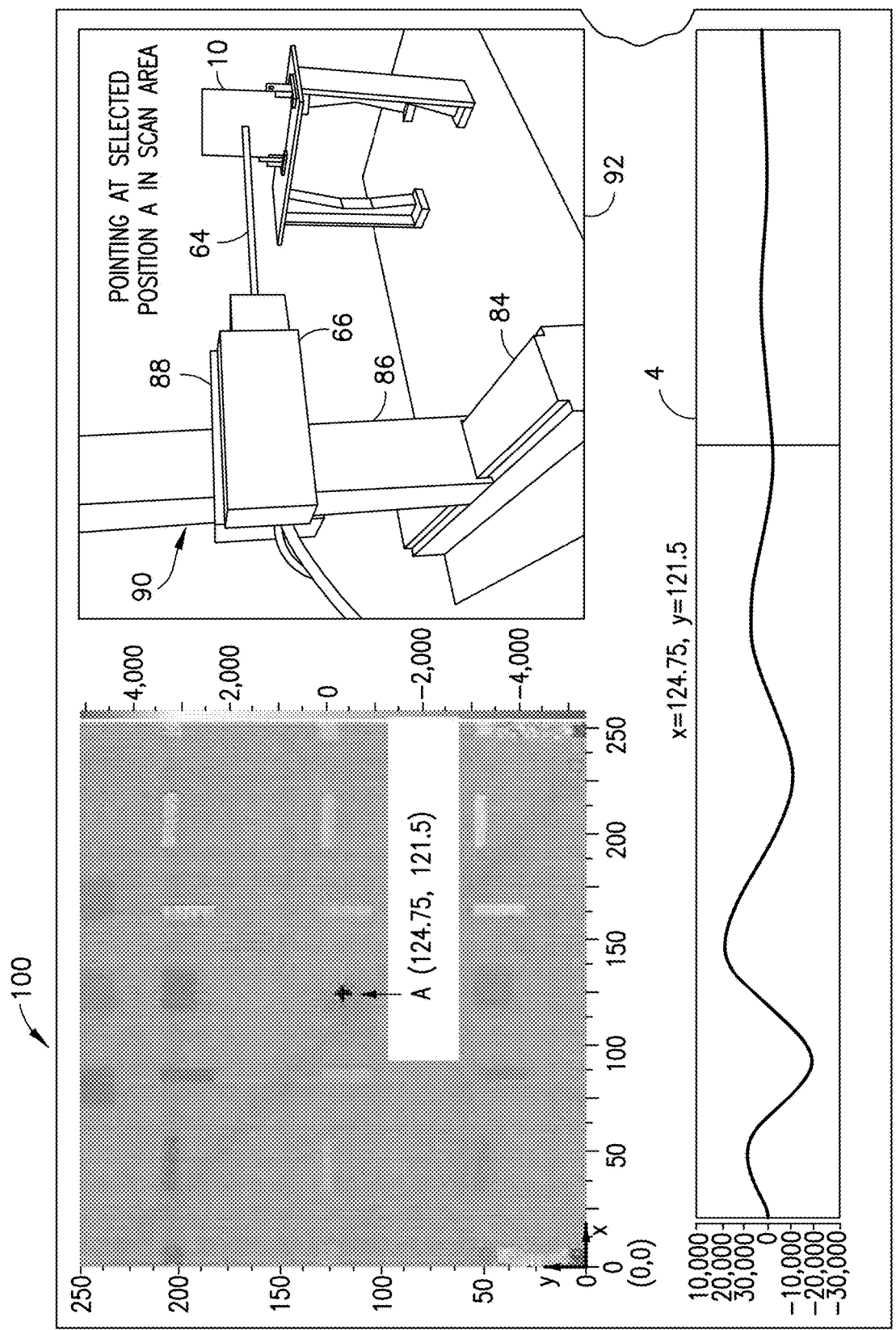
FIG. 11 shows a graphical user interface comprising respective windows containing a video freeze-frame, a video image of a test setup acquired by a video camera, and an amplitude-versus-time graph representing ultrasonic wave propagation when a laser pulse is pointed at an anomaly using an anomaly pointing function.

FIG. 11 shows a graphical user interface 100 comprising a first window containing a video freeze-frame 32, a second window comprising a video image 92 of the test setup acquired by a video camera (not shown), and a window showing an amplitude-versus-time graph 4 representing the propagation of the ultrasonic wave produced when a laser pulse is pointed at the anomaly using the anomaly pointing function. Optionally, the coordinates of the laser spot may be displayed on the video freeze-frame 32. In the example depicted in FIG. 11, the coordinates of the selected position in the frame of reference of the two-axis linear positioner 90 are (124.75, 121.5).

As seen in FIG. 11, the two-axis linear positioner 90 comprises a stationary mounting stage 84, an X-axis linear stage 86 which is translatably coupled to the mounting stage 84 for translation in either direction along an X-axis, and a Y-axis linear stage 88 translatably coupled to the X-axis linear stage 86 for translation in either direction along a Y-axis. The laser scanning head 66 is fixedly coupled to the Y-axis linear stage 88. The structure and operation of multi-axis linear positioners is well known in the art of robotics.

More generally, some of the above-described features may be combined to provide a method for enhanced visualization of anomalies in a structure, which method comprises the following steps: (a) acquiring pulse-echo laser ultrasonic wave propagation imaging video data at a multiplicity of points in a scan area on a surface of a structure; (b) post-processing the pulse-echo laser ultrasonic wave propagation imaging video data using multiple-time window amplitude mapping to create a multiple-time window amplitude map; (c) displaying the multiple-time window amplitude map on a graphical user interface; (d) selecting at least three points on the multiple-time window amplitude map by human interaction with the graphical user interface; (e) calculating an area of a polygon defined by the at least three points; (f) displaying alphanumeric symbology representing the area calculated in step (e) on the graphical user interface; (g) selecting a point on the multiple-time window amplitude map by human interaction with the graphical user interface; (h) converting pixel coordinates of the point selected in step (g) to spatial coordinates in a frame of reference of a positioner that supports a laser scanning head; (i) controlling the positioner to move the laser scanning head to a pointing position having the spatial coordinates resulting from step (h); and (j) activating the laser scanning head to emit a laser beam while the laser scanning head is in the pointing position. In the alternative, the polygonal anomaly area calculation and the anomaly pointing function may be enabled by the user interacting with a portion of the graphical user interface that is displaying a freeze-frame.

While methods and apparatus for post-processing pulse-echo laser UMPI video data to enhance visualization of anomalies in a structure have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

As used herein, the term "computer system" should be construed broadly to encompass a system having at least one computer or processor, and which may have multiple computers or processors that communicate through a network or bus.

Some steps of the methods described herein may be encoded as executable instructions embodied in a non-transitory tangible computer-readable storage medium, including, without limitation, a storage device and/or a memory device. Such instructions, when executed by a processing or computing system, cause the system device to perform at least a portion of the methods described herein.

The method claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

The invention claimed is:

1. A method for enhanced visualization of anomalies in a structure, comprising:
  (a) acquiring pulse-echo laser ultrasonic wave propagation imaging video data at a multiplicity of points in a scan area on a surface of a structure;
  (b) post-processing the pulse-echo laser ultrasonic wave propagation imaging video data using multiple-time window amplitude mapping to create a multiple-time window amplitude map, wherein the post-processing comprises:
  designating at least one time window comprising a multiplicity of video freeze-frames, wherein each of the video freeze-frames correlates with a respective depth in the structure based on the speed of the wave propagation;

selecting the one or more time windows in which a maximum magnitude of the amplitude of the wave is greater than a predetermined threshold; and creating the multiple-time window amplitude map being defined as a single image based on summed amplitude magnitudes in the selected video freeze-frames of the one or more selected time windows; and (c) displaying the multiple-time window amplitude map on a graphical user interface.

2. The method of claim 1, wherein said selecting of the one or more time windows of operation (b) is repeated until all the time windows having said maximum magnitude of the amplitude are selected.

3. The method as recited in claim 1, further comprising:

(d) selecting at least three points on the multiple-time window amplitude map by human interaction with the graphical user interface;

(e) calculating an area of a polygon defined by the at least three points; and (f) displaying alphanumeric symbology representing the area calculated in step (e) on the graphical user interface.

4. The method as recited in claim 3, wherein the at least three points are positioned on a boundary of an image of an anomaly displayed on the graphical user interface.

5. The method as recited in claim 3, further comprising:

(g) selecting a point on the multiple-time window amplitude map by human interaction with the graphical user interface;

(h) converting pixel coordinates of the point selected in step (g) to spatial coordinates in a frame of reference of a positioner that supports a laser scanning head;

(i) controlling the positioner to move the laser scanning head to a pointing position having the spatial coordinates resulting from step (h); and (j) activating the laser scanning head to emit a laser beam while the laser scanning head is in the pointing position.

6. The method as recited in claim 5, wherein steps (h) through (j) are performed automatically in response to step (g).

7. The method as recited in claim 1, further comprising:

(d) selecting a point on the multiple-time window amplitude map by human interaction with the graphical user interface;

(e) converting pixel coordinates of the point selected in step (d) to spatial coordinates in a frame of reference of a positioner that supports a laser scanning head;

(f) controlling the positioner to move the laser scanning head to a pointing position having the spatial coordinates resulting from step (e); and (g) activating the laser scanning head to emit a laser beam while the laser scanning head is in the pointing position.

8. The method as recited in claim 7, wherein steps (e) through (g) are performed automatically in response to step (d).

9. A method for enhanced visualization of anomalies in a structure, comprising:

(a) acquiring pulse-echo laser ultrasonic wave propagation imaging video data at a multiplicity of points in a scan area on a surface of a structure;

(b) post-processing the pulse-echo laser ultrasonic wave propagation imaging video data to create a video freeze-frame;

(c) displaying the video freeze-frame on a graphical user interface;

(d) selecting at least three points on the video freeze-frame by human interaction with the graphical user interface;

(e) calculating an area of a polygon defined by the at least three points; and (f) displaying alphanumeric symbology representing the area calculated in step (e) on the graphical user interface.

10. The method as recited in claim 9, wherein the at least three points are positioned on a boundary of an image of an anomaly displayed on the graphical user interface.

11. The method as recited in claim 9, further comprising:

(g) selecting a point on the freeze frame by human interaction with the graphical user interface;

(h) converting pixel coordinates of the point selected in step (g) to spatial coordinates in a frame of reference of a positioner that supports a laser scanning head;

(i) controlling the positioner to move the laser scanning head to a pointing position having the spatial coordinates resulting from step (h); and (j) activating the laser scanning head to emit a laser beam while the laser scanning head is in the pointing position.

12. The method as recited in claim 11, wherein steps (h) through (j) are performed automatically in response to step (g).

13. A method for enhanced visualization of anomalies in a structure, comprising:

(a) acquiring pulse-echo laser ultrasonic wave propagation imaging video data at a multiplicity of points in a scan area on a surface of a structure;

(b) post-processing the pulse-echo laser ultrasonic wave propagation imaging video data to create a video freeze-frame;

(c) displaying the video freeze-frame on a graphical user interface;

(d) selecting a point on the video freeze-frame by human interaction with the graphical user interface;

(e) converting pixel coordinates of the point selected in step (d) to spatial coordinates in a frame of reference of a positioner that supports a laser scanning head;

(f) controlling the positioner to move the laser scanning head to a pointing position having the spatial coordinates resulting from step (e); and (g) activating the laser scanning head to emit a laser beam while the laser scanning head is in the pointing position.

14. The method as recited in claim 13, wherein steps (e) through (g) are performed automatically by a computer system executing an anomaly pointing function in response to step (d).

15. An apparatus for enhanced visualization of anomalies in a structure, comprising:

a pulse-echo laser ultrasonic wave propagation imaging system comprising a laser scanning head;

a graphical user interface; and a computer system configured to perform the following operations:

(a) receiving pulse-echo laser ultrasonic wave propagation imaging video data from pulse-echo laser ultrasonic wave propagation imaging system;

(b) post-processing the pulse-echo laser ultrasonic wave propagation imaging video data using multiple-time window amplitude mapping to create a multiple-time window amplitude map, wherein the post-processing comprises:

designating at least one time window comprising a multiplicity of video freeze-frames, wherein each of the video freeze-frames correlates with a respective depth in the structure based on the speed of the wave propagation;

selecting the one or more time windows in which a maximum magnitude of the amplitude of the wave is greater than a predetermined threshold; and creating the multiple-time window amplitude map being defined as a single image based on summed amplitude magnitudes in the selected video freeze-frames of the one or more selected time windows; and (c) controlling the graphical user interface to display the multiple-time window amplitude map.

16. The apparatus as recited in claim 15, wherein the computer system performing the operation (b) is further configured to repeat the selection of the one or more time windows until all the time windows having the maximum magnitude of the amplitude are selected.

17. The apparatus as recited in claim 15, wherein the computer system is further configured to perform the following operations:

(d) receiving data representing selections of at least three points from the multiple-time window amplitude map;

(e) calculating an area of a polygon defined by the at least three points; and (f) controlling the graphical user interface to display alphanumeric symbology representing the area calculated in operation (e).

18. The apparatus as recited in claim 17, wherein the at least three points are positioned on a boundary of an image of an anomaly displayed on the graphical user interface.

19. The apparatus as recited in claim 17, wherein the pulse-echo laser ultrasonic wave propagation imaging system further comprises a positioner to which the laser scanning head is mounted, and the computer system is further configured to perform the following operations:

(g) receiving data representing a selection of a point on the multiple-time window amplitude map;

(h) converting pixel coordinates of the selected point to spatial coordinates in a frame of reference of the positioner;

(i) controlling the positioner to move the laser scanning head to a pointing position having the spatial coordinates resulting from operation (h); and (j) activating the laser scanning head to emit a laser beam while the laser scanning head is in the pointing position.

20. The apparatus as recited in claim 19, wherein the positioner is a two-axis linear positioner.

* * * * *